A. Smith.
Mower.
N° 95,738. Patented Oct. 12, 1869.
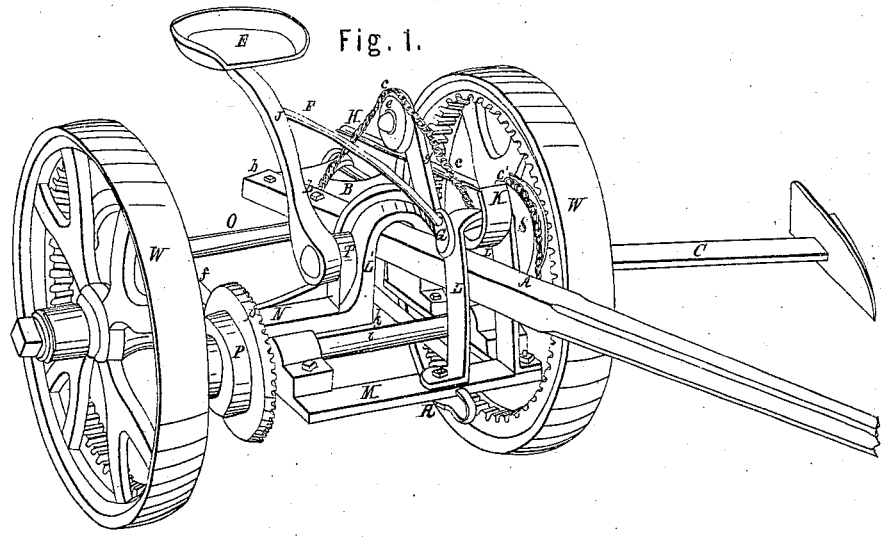
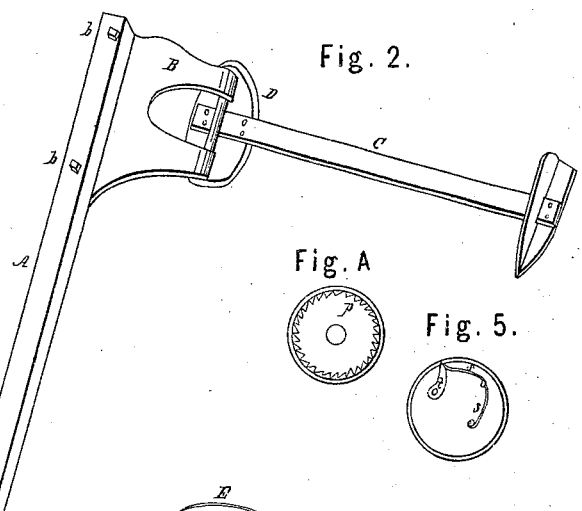
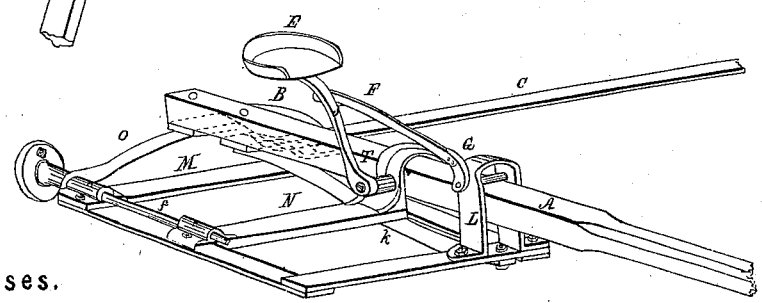
Witnesses.
B. C. Converse
J. F. Schneibergen
Inventor.
Amos Smith

United States Patent Office.

AMOS SMITH, OF SPRINGFIELD, OHIO.

*Letters Patent No. 95,738, dated October 12, 1869; antedated April 12, 1869.*

---

IMPROVEMENT IN HARVESTERS.

---

The Schedule referred to in these Letters Patent and making part of the same.

---

*To all whom it may concern:*

Be it known that I, AMOS SMITH, of the city of Springfield, county of Clark, and State of Ohio, have invented a new and useful Improvement in Harvesters; and I do declare that the following is a full, clear, and accurate description thereof, reference being had to the accompanying drawings, making a part of this specification, in which—

Figure 1 is a perspective view of a harvester to which my improvements are attached.

Figure 2 represents the tongue, with sickle-bar attached thereto by a lug-plate.

Figures 4 and 5 represent ratchet-and-pawl attachments.

Similar letters of reference indicate corresponding parts in the several figures.

The object of my invention consists in lightening the draught of a harvester by attaching the cutting-apparatus to the rear of the tongue, in such manner that it can be raised by the weight of the driver upon the seat, and also by means of a hand-lever, which latter is so attached as to raise the tongue or draught-pole, with its attachments, (sickle-bar, and parts in connection therewith,) and hold the same up off the ground, it being held by a pin or ratchet.

In fig. 1, A is the tongue or draught-pole, which is shown passing from front to rear, through the guide-way L L, which is bolted upon the front of the frame M, thence through the curved bed-plate N, and back to the rear of the machine, where the lug-plate B, which connects the tongue to the cutting-apparatus, is fastened to it by a bolt or bolts, *b b;* and the supporting-bar O is likewise rigidly attached to the tongue at this point, and at its other end flexibly attached to a collar upon the crank-box of the fly-wheel shaft, on the rear of the frame M.

C represents the cutter-bar, with shoe D, attached by a hinged joint to the lug-plate B, as shown in fig. 2.

E is the seat for driver, mounted upon the arm J, which arm is flexibly attached to the curve of bed-plate N, at T.

F is a connecting-rod, running from the crank G, of the lifting-mechanism, to the arm J of the seat, where it is made adjustable, by a series of holes through it for a bolt or pin passing into the seat-arm.

The small shaft to which the crank G is attached, passes through the top of guide-way L L, and at its other end, a segment, S, with groove upon its periphery, is attached.

This segment has a bearing-chain, *c*, attached near its upper angle, (running upon its grooved edge,) connecting it with the tongue at the front of the machine.

The shaft of crank G has a presser-foot, K, attached to it, (working within the guide-way L L,) acting automatically, its use being to keep the frame of the machine parallel with the surface of the ground.

At the lower part of the segment S, the chain *c c* is attached, and passes back over the grooved pulley *e*, (upon the curved arm *g*,) to the rear of the tongue, where it is attached to the lug-plate B.

These bearing-chains support the weight of the tongue, with its attachments, when it is required to raise the same by the weight of the driver upon the seat E, and also by the hand-lever H.

The flexible attachment of the supporting-bar O, to the collar of the crank-box, admits of the easy raising and lowering of the tongue, and its attachments, by the lifting-mechanism described.

The pinion-shaft *i*, driven by the drive-wheels W, has a bevel-wheel, *p*, upon it, just outside of the frame next the outside drive-wheel, which bevel-wheel, has a ratchet-and-pawl attachment on each side of it, working in combination with it, and so arranged as to allow each drive-wheel to run independent of the other, in turning, backing, &c.

These ratchets and pawls are so attached as to make the whole very compact.

The bevel-wheel *p* meshes into a pinion upon the fly-wheel shaft *f*, at its forward end, transmitting the power from the drive-wheels W, through this shaft, to the cutting-apparatus.

A draught-rod, *k*, runs from the front of the frame, where it is attached, to the rear of the tongue, and is bolted to it and the lug-plate B. This rod holds the tongue and cutting-apparatus in position.

Having thus described my invention,

What I claim, and desire to secure by Letters Patent, is—

1. The bed-plate N, constructed with a curve, to admit of the passage and free play of the tongue, substantially as shown and described.

2. The combination of seat-support J, adjustable connecting-rod F, crank G, and hand-lever H, arranged and operating to raise the tongue and cutting-apparatus attached thereto, substantially as shown and described.

3. The combination of hand-lever H, segment S, crank G, guide-way L, and presser-foot K, operating substantially as and for the purpose described.

4. The supporting-bar O, attached flexibly, at one end to the collar of the box of the crank-shaft, and, at the other end, rigidly to the rear of the tongue and lug-plate B, substantially as shown and described.

5. The lifting-mechanism, consisting of seat-support J, adjustable connecting-rod F, crank G, segment S, hand-lever H, and bearing-chains $c$ and $c'$, for raising and lowering the tongue and its attachments, by the weight of the driver and hand-lever combined, substantially as shown and described.

6. The draught-rod $k$, connecting the front of the frame with the rear of the tongue, (and its attachments,) to hold the same in position, as shown and described.

Witness my hand to this application for a patent for my improvement in harvesters, March 5, 1869.

AMOS SMITH.

Witnesses:
    B. C. CONVERSE,
    J. F. SCHNEEBERGER.